(12) United States Patent
Wiehardt et al.

(10) Patent No.: US 8,677,159 B2
(45) Date of Patent: Mar. 18, 2014

(54) SYSTEM AND METHOD FOR EXTENDING THE USB POWER SIGNAL

(75) Inventors: Wendy S. Wiehardt, Fort Collins, CO (US); Samuel M. Babb, Fort Collins, CO (US); Jeffrey Christenson, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 195 days.

(21) Appl. No.: 13/387,054

(22) PCT Filed: Nov. 6, 2009

(86) PCT No.: PCT/US2009/063551
§ 371 (c)(1),
(2), (4) Date: Jan. 25, 2012

(87) PCT Pub. No.: WO2011/056177
PCT Pub. Date: May 12, 2011

(65) Prior Publication Data
US 2012/0210144 A1    Aug. 16, 2012

(51) Int. Cl.
*G06F 1/00* (2006.01)
*G06F 13/20* (2006.01)

(52) U.S. Cl.
USPC ........................... 713/300; 713/330; 710/313

(58) Field of Classification Search
USPC ......................................................... 713/300
See application file for complete search history.

(56) References Cited

U.S. PATENT DOCUMENTS

| 7,076,683 | B2 * | 7/2006 | Saito et al. ..................... 713/601 |
| 7,395,366 | B1 | 7/2008 | Wright |
| 8,069,277 | B2 * | 11/2011 | Suematsu ....................... 710/14 |
| 2004/0139262 | A1 | 7/2004 | Beaudoin et al. |
| 2006/0020736 | A1 | 1/2006 | Jackson |
| 2008/0082842 | A1 * | 4/2008 | Minami ........................ 713/300 |

* cited by examiner

*Primary Examiner* — Suresh Suryawanshi

(57) ABSTRACT

A system and method for extending the USB VBUS power signal. A system for extending the USB VBUS power signal includes at least one PCA board. The system includes a USB host. The USB host outputs a new power signal compliant with USB VBUS power signal requirements. The VBUS signal may be connected to a voltage converter to change the voltage level to a desired enable signal for the voltage supply at the receiving end of the system. The VBUS signal may be connected to logic to change the polarity of the enable signal. The enable signal is routed across traces on the one or more PCA boards. A voltage supply is located on a PCA board and receives the enable signal. The enable signal causes the voltage supply to output a new power signal that is compliant with USB VBUS power signal requirements.

15 Claims, 2 Drawing Sheets

SYSTEM AND METHOD FOR EXTENDING THE USB POWER SIGNAL

BACKGROUND

Universal Serial Bus, or USB, is a bus, standard widely used in personal computers, servers, cameras, DVD players, mobile phones and other applications. A USB system has an asymmetric design, typically consisting of a host, a single or a plurality of downstream USB ports, and one or more peripheral devices connected in a tiered-star topology. Additional USB hubs may be included in the tiers, allowing branching into a tree structure with up to five tier levels.

The USB VBUS signal is part of the USB specification. Specifically, the VBUS signal is one of the four signals required by USB. The other three USB signals are a ground (GND) signal, and the positive and negative wires of a differential data signal (labeled as D+ and D−). VBUS is required by both bus-powered and self-powered Hubs and peripheral devices. For bus-powered peripheral devices, VBUS is the power line provided by a USB host, providing the primary power for such devices. For self-powered peripheral devices, VBUS signals a "powered state" required by the USB specification. The VBUS signal may also be used by self-powered peripheral devices to maintain USB interface functionality when the remainder of the self-powered peripheral device is powered down.

In order to be in compliance with USB, the VBUS signal must maintain specific voltage and current levels. According to the USB specification, the VBUS signal voltage may vary from 4.35 to 5.25 volts with respect to ground. However, if a USB host supplies voltage at or near the 4.35 volt lower limit, there is a risk of device resets or poor reliability, so bus attenuation must be considered when designing a USB network.

The USB specifications are primarily concerned with cable connectivity, not PCA-networked systems. PCA (printed circuit assembly) routed signals have different attenuation issues than a cable routed signal. A signal routed across PCA-to-PCA connectors can accumulate significant attenuation. Consequently, a VBUS signal routed across PCA-networked systems with multiple PCA-to-PCA connectors can lose its voltage margin and fall below the 4.35 volt lower limit. Accordingly, such PCA-networked systems provide a significant hurdle for USB VBUS signal propagation.

VBUS signal propagation is less problematic in cable networks. Therefore, connecting PCAs together with cables would seem a solution to the VBUS signal propagation issue. However, it is often desirable to minimize the number of cable connections by routing directly from PCA-to-PCA. Cable connectors take up significantly more area than a routed trace on a PCA. Moreover, cable connectors do not survive shock and vibe testing as well as routed traces. Furthermore, systems with large numbers of cables can confuse end-users and impose additional mechanical cable management requirements and PCA bulkhead space.

USB repeaters and hubs (i.e., an electrical interface between a USB host and USB device that provides connectivity management and repeater functionality) can be used to address the VBUS signal propagation issue across PCAs. However, solutions utilizing repeaters or hubs have significant limitations. For example, such a solution requires the addition of specialized parts (i.e., the repeaters and hubs) to each PCA. This adds expense and may cause problems because of space and size limitations. Additionally, midplane PCA and backplane PCA requirements often preclude the use of active parts, so repeaters or hubs cannot be used on many midplanes and backplanes. Likewise, repeaters and hubs require a specific voltage rail which may not be readily available on all PCAs without adding new power circuits. This also adds expense and takes up space is often not practical for PCAs with small or limited areas or for PCAs that must be of a minimal cost.

SUMMARY

A system and method for extending VBUS power signals across multiple PCA board-level connections. A system for extending USB VBUS power signals across multiple PCA board-level connections includes one or more PCA boards. The system includes a USB host located on one of the PCA boards. The USB host outputs a USB VBUS power signal compliant with USB VBUS power signal requirements. Optionally, the VBUS, the VBUS signal can be connected to logic to change the polarity of the desired enable signal. The enable signal is routed across traces on the one or more PCA boards. A voltage supply is located on one of the one or more PCA boards and receives the enable signal. The enable signal causes the voltage supply to output a new USB VBUS power signal that is compliant with USB VBUS power signal requirements.

A method for extending USB VBUS power signals across multiple PCA board-level connections includes a USB host providing a USB VBUS power signal compliant with USB VBUS power signal requirements. The USB VBUS power signal is converted into an enable signal. The enable signal is routed across one or more PCA boards. The method inputs the enable signal into a voltage supply. In response to receiving the enable signal, the voltage supply outputs a new USB VBUS power signal compliant with USB VBUS power signal requirements.

DESCRIPTION OF THE DRAWINGS

The detailed description will refer to the following drawings, wherein like numerals refer to like elements, and wherein.

DETAILED DESCRIPTION

Described herein are embodiments of system and method for extending USB VBUS power signals across multiple PCA board-level connections. As described above, the USB VBUS is one of four signals specified by USB. The VBUS signal, along with the other three USB signals, originates from a USB Host. Ordinarily, the VBUS signal is routed directly to the receiving USB peripheral or hub. In embodiments described herein, the VBUS signal instead is used to trigger an Enable signal which is instead routed across the multiple PCA board-level connections. The Enable signal is routed across multiple PCA boards without concern for the USB VBUS power requirements set forth above. At a peripheral PCA board (e.g., a PCA board to which a bus-powered peripheral device interfaces), the Enable signal is used to gate a voltage supply located on the peripheral PCA board. The voltage supply provides a signal as the VBUS power signal within the margin of the required 4.35 to 5.25 volts range.

Figure 1:
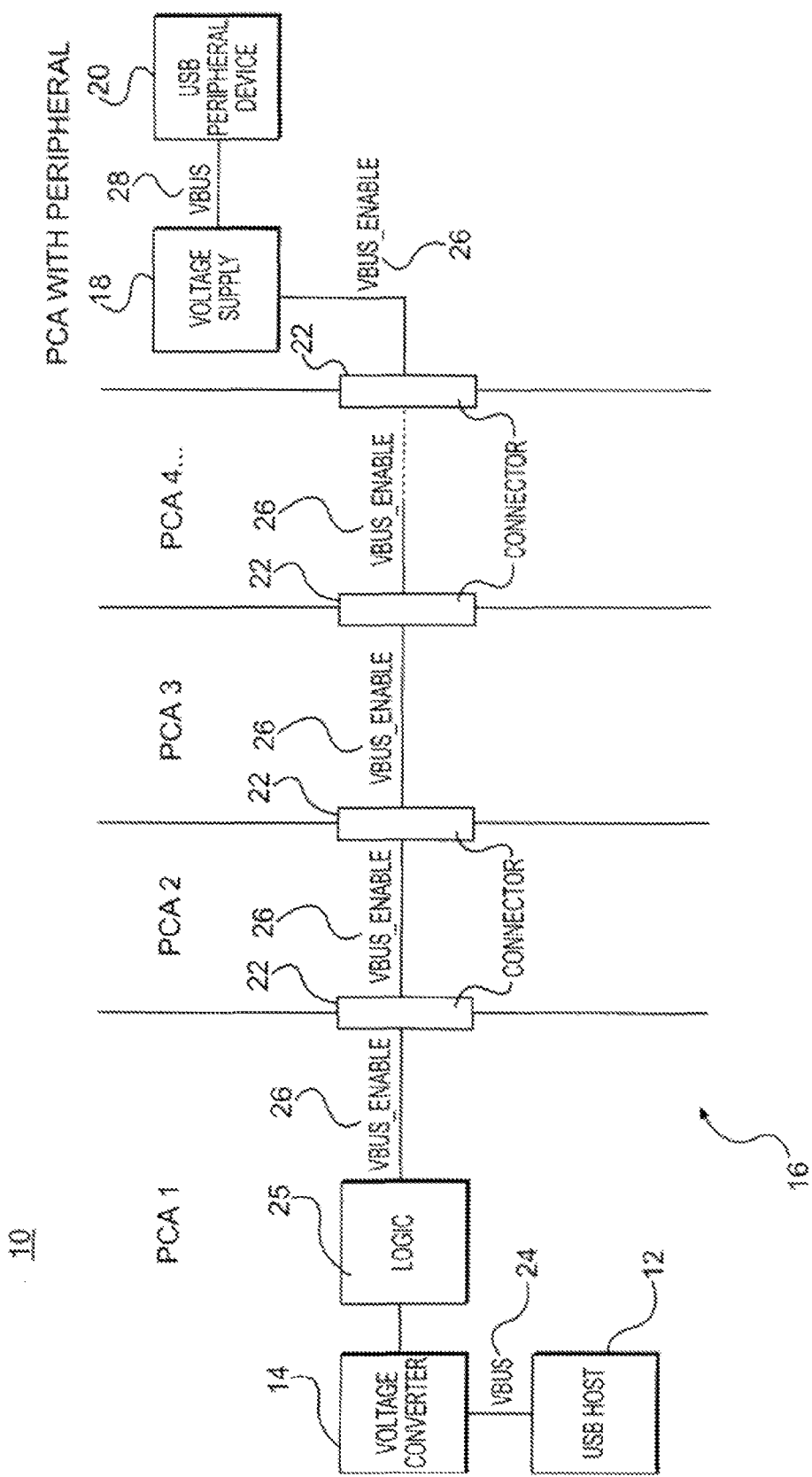
FIG. 1 is a block diagram illustrating an embodiment of a system for extending USB VBUS power signals across multiple PCA board-level connections.

With reference now to FIG. 1, shown is an embodiment of system 10 for extending USB VBUS power signals across multiple PCA board-level connections. As shown, system 10 may include USB host 12, voltage converter 14, one or more PCA boards 16 (labeled PCA 1, PCA 2, PCA 3, PCA 4 . . . , and PCA with Peripheral), voltage supply 18 and a USB end-point USB bus-powered peripheral device, USB self-powered peripheral device or HUB) 20. The PCA boards 16 are connected to each other with PCA board connectors 22. The PCA board connecters 22 electrically connect traces on adjacent PCA boards 16. Other components, not shown, may be installed on PCA boards. Note, system 10 may be implemented on a single PCA board 16 and USB host 12, voltage converter 14, and voltage supply 18 may all be co-located on one PCA board 16.

USB host 12 may be installed on one of the PCA boards 16; as shown, it is installed on the PCA board 16 labeled PCA 1. In operation, USB host 12 may provide the VBUS power signal 24, as well as the other three USB signals (not shown). VBUS power signal 24, if in compliance with USB requirements, will have voltage in the 4.35 to 5.25 volt range. For example, VBUS power signal may be 5 volts. The VBUS power signal may be routed, e.g., via traces on the PCA board 16, to voltage converter 14. Also, optionally, the VBUS power signal may be routed to a programmed or discrete logic circuit or other circuitry 25 to adjust the polarity of the signal and/or to output an Enable signal. The polarity may be set as is appropriate for PCA system. Accordingly, VBUS power signal is separately routed from other three USB signals output by USB host 12. Voltage converter 14 converts VBUS power signal to an Enable signal (or, alternatively, logic receives VBUS power signal and outputs an Enable signal), e.g., VBUS_Enable signal 26. VBUS_Enable signal 26 may be routed across multiple PCA boards 16, e.g., across traces on PCA boards 16 and via PCA board connectors 22 as shown.

With continuing reference to FIG. 1, on a PCA board 16 to which one or more USB end-points (e.g., USB peripherals or HUBs) 20 are connected, VBUS_Enable signal 26 is routed (e.g., via traces on the PCA boards 16) to voltage supply 18. Receipt of VBUS_Enable signal 24 enables voltage supply 18 to output a new power signal 28 that, for connected USB end-point (e.g., HUB or peripheral device) 20, functions and serves as the VBUS power signal 24. In other words, VBUS_Enable signal 26 gates the new power signal 28. The new VBUS power signal is compliant with USB VBUS power signal requirements. The power supply 18 provides VBUS power signal 28 with a voltage in the 4.35 to 5.25 volt range, e.g., 5 volts. VBUS power signal 28 may be output to USB end-point (e.g., HUB or peripheral device) 20 along with three other non-VBUS USB signals.

Among the advantages VBUS_Enable signal 26 may be set to a voltage and polarity that is convenient for the design of the PCA system. The VBUS_Enable signal 26 does not need to comply with the 4.35 to 5.25 volt range required, by the USB requirements. As long as the VBUS_Enable signal 26 is sufficient to enable voltage supply 18 to output the VBUS power signal 28 after being routed across multiple PCA boards 16, VBUS_Enable signal 26 can be set at any level. Concerns about power attenuation and other problems with routing VBUS power signals across multiple PCA boards are alleviated by system 10. The necessity for cables, repeaters or hubs to extend the signal is avoided by system 10.

With continuing reference to FIG. 1, it is noted that USB peripheral devices 20 may be connected to any of PCA boards 16. Accordingly, other PCA boards 16, besides PCA board 16 labeled PCA with peripheral may include voltage supply 18 to which VBUS_Enable signal 26 is routed. Likewise, each PCA board 16 may have multiple USB ports and multiple USB peripheral devices attached thereto, to which new VBUS power signal 28 is supplied. Moreover, the other non-VBUS USB signals (not shown) may be routed via traces (not shown) and connectors 22 across multiple PCA boards 16 to USB end point 20, as is ordinarily done. USB end-point 20 may be a bus-powered USB device, in which case VBUS power signal 28 provides power to USB peripheral device 20. USB end-point 20 may be a self-powered USB device, in which case VBUS power signal 28 signals "powered state" to USB peripheral device 20 and may provide power to USE peripheral device 20 to enable maintenance of USB interface functionality when remainder of USB peripheral device is powered down. USB end-point 20 may also be a HUB 20 extending to multiple other peripheral devices on the on the PCA with Peripheral.

Figure 2:
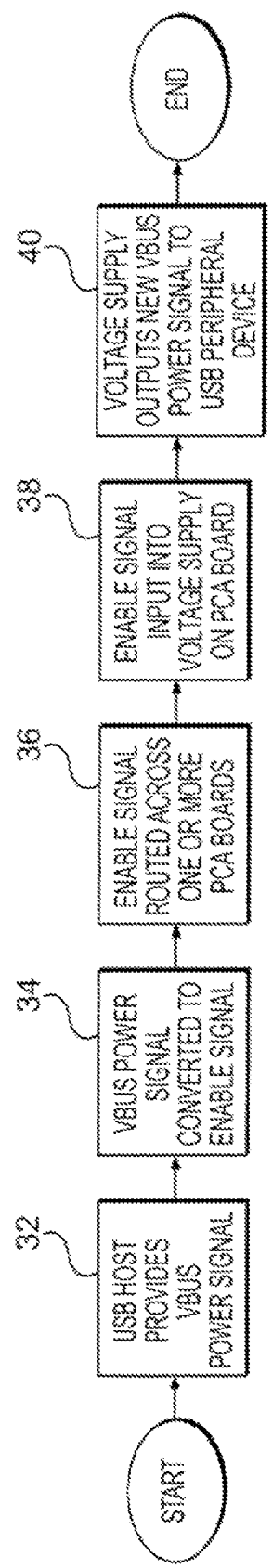
FIG. 2 is a flowchart illustrating an embodiment of a method for extending USB VBUS power signals across multiple PCA board-level connections.

With reference now to FIG. 2, shown is an embodiment of method 30 for extending USB VBUS power signals across multiple PCA board-level connections. USB host provides a USB VBUS power signal, block 32. USB VBUS power signal is converted into an Enable signal, block 34. The enable signal is routed across one or more PCA boards in a PCA board system, block 36. As discussed above, the Enable signal may be routed across traces on PCA boards and via PCA board connectors. The enable signal is input into voltage supply on one of the one or more PCA boards, enabling the voltage supply, block 38. The voltage supply outputs a new VBUS power signal to a USB peripheral device, block 40. As described herein, the new VBUS power signal acts as the VBUS power signal provided by USB host and is in the USB specified voltage range of 4.35 to 5.25 volt range. The enable signal may be input 38 into a plurality of voltage supplies on a plurality, of boards, enabling the output 40 of a plurality of new VBUS power signals to a plurality of USB peripheral devices.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

What is claimed is:

1. A system for extending USB VBUS power signals across multiple PCA board-level connections, comprising:
   at least one PCA board;
   a USB host, wherein the USB host outputs a USB VBUS power signal compliant with USB VBUS power signal requirements;
   a voltage converter that receives the USB VBUS power signal and converts the USB VBUS power signal to an enable signal and the enable signal is routed across traces on the at least one PCA boards; and
   a voltage supply, wherein the voltage supply receives the enable signal and the enable signal causes the voltage supply to output a new power signal that is compliant with USB VBUS power signal requirements.

2. The system of claim 1 further comprising a USB end-point wherein the USB end-point receives the new power signal.

3. The system of claim 2 wherein the USB end-point is a USB peripheral device.

4. The system of claim 3 wherein the USB peripheral device is a bus-powered USB peripheral device.

5. The system of claim 3 wherein the USB peripheral device is a self-powered USB peripheral device.

6. The system of claim 1 comprising a plurality of PCA boards.

7. The system of claim 1 wherein the USB host and voltage converter are co-located on the same PCA board.

8. The system of claim 1 wherein the voltage supply is located on a different one of the at least one PCA boards than the USB host.

9. The system of claim 6 wherein the plurality of PCA boards are electrically connected by PCA board connectors and the enable signal is routed across PCA board connectors.

10. The system of claim 1 wherein the voltage converter comprises logic to output the enable signal.

11. The system of claim 1 further comprising includes logic to set the polarity of the enable signal.

12. A method for extending USB VBUS power signals across multiple PCA board-level connections, comprising:
- a USB host providing a USB VBUS power signal compliant with USB VBUS power signal requirements;
- converting the USB VBUS power signal into an enable signal;
- routing the enable signal across one or more PCA boards;
- inputting the enable signal into a voltage supply; and
- in response to receiving the enable signal, the voltage supply outputting a new power signal compliant with USB VBUS power signal requirements.

13. The method of claim 12 wherein the routing routes the enable signal across traces on the one or more PCA boards.

14. The method of claim 12 wherein the routing routes the enable signal across a plurality of PCA boards, via PCA board connectors connecting the plurality of PCA boards.

15. The method of claim 12 further comprising outputting the new USB VBUS power signal to a USB peripheral device.

\* \* \* \* \*